Sept. 15, 1936.  C. O. ROSS  2,054,447

PLATFORM MOUNTING FOR WEIGHING SCALES

Filed May 6, 1932

INVENTOR.
CLIFFORD O. ROSS
BY
ATTORNEYS.

Patented Sept. 15, 1936

2,054,447

UNITED STATES PATENT OFFICE 2,054,447

PLATFORM MOUNTING FOR WEIGHING SCALES

Clifford O. Ross, Los Angeles, Calif.

Application May 6, 1932, Serial No. 609,745

3 Claims. (Cl. 265—27)

This invention relates to weighing scales of the general character embodied in my co-pending application Serial No. 517,075, filed February 19, 1931, which has matured into Patent No. 1,887,169.

It is a purpose of the present invention to provide a mounting for the platform of the scale which is extremely simple in construction and operates to movably mount the platform with the absence of practically all friction and wear such as is present in mountings characterized by pivotal and sliding connections between the platform and a support therefor.

It is a further purpose of this invention to provide a platform mounting characterized by flexibile check members preferably in the form of spring tempered metallic tapes or strips correlated with the platform and a support in such manner as to be placed under tension and to coact by their flexibility in providing a practically frictionless mounting of the platform for movement by loads on the platform.

Only one form of the invention will be described, following which its novel features will be pointed out in claims.

In the accompanying drawing

Figure 1:
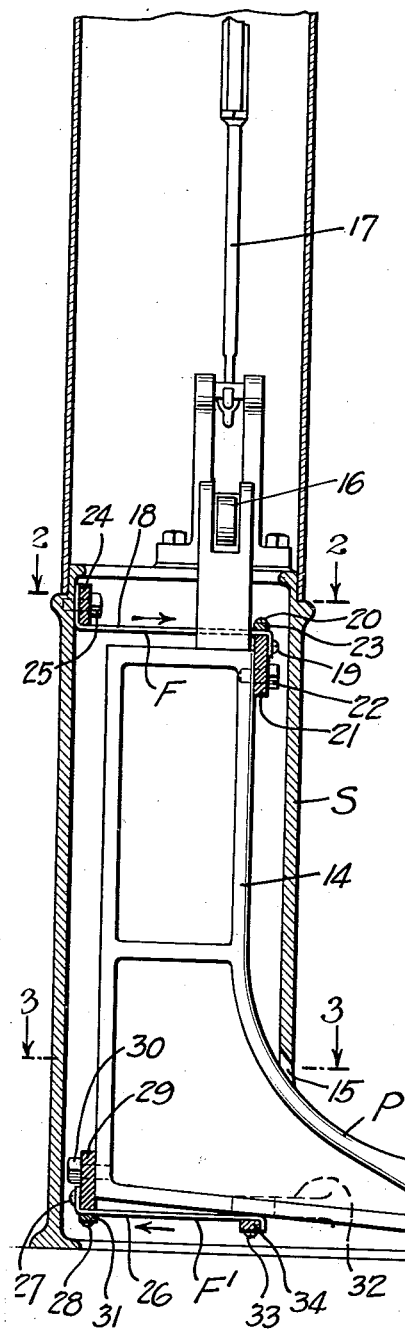
Figure 2:
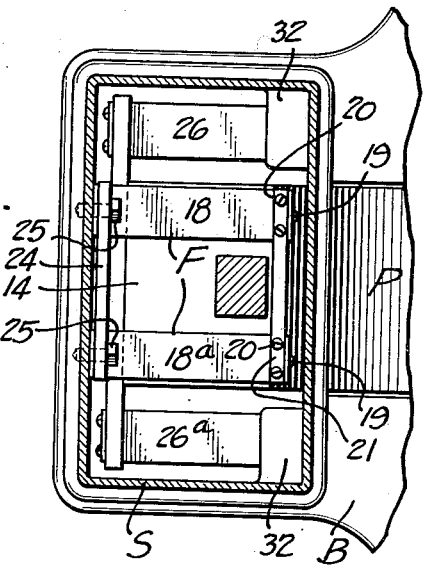
Figure 3:
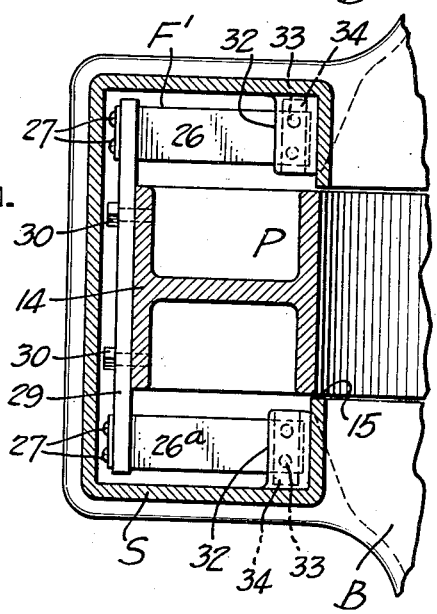

Figure 1 is a view showing in vertical section one form of platform mounting for weighing scales, embodying this invention;

Figures 2 and 3 are enlarged horizontal sectional views taken, respectively, on the lines 2—2 and 3—3 of Figure 1, and looking in the directions of the respective arrows.

Referring specifically to the drawing, wherein similar reference characters designate similar parts in each of the several views, this invention is illustrated by the provision of a support in the form of a base B, from which rises a hollow standard S, the base having an opening 10 for receiving the horizontal portion 13 of a substantially L-shaped platform P. The vertical portion 14 of the platform extends into the standard through a slot 15 in the latter communicating with the opening 10. The specific construction of the base and platform eliminating any obstruction over which a person would be likely to trip or stumble, forms no part of the present invention and is fully described and claimed in my application above referred to.

In order to create a practically frictionless mounting for the platform by which the latter is supported for vertical movement transmitted to a suitable indicating mechanism at the top of the standard (not shown), through the medium of a compounding lever system 16 and a draw rod 17, I provide flexible check members F and F' connected to the platform and its support at such locations relatively as to be placed under tension and to coact by their flexibility in mounting the platform for the vertical movement.

The upper check member F comprises a pair of spring tempered metallic tapes or strips 18 and 18$^a$ rigidly secured at one end in spaced parallel relation to the upper forward corner of the vertical portion 14 of the platform by means of screws 19 and 20, the screws 19 passing through the tapes into a cross bar 21 fixed to the vertical portion 14 by bolts 22, and the screws 20 passing through a cap strip 23 and the tapes into the cross bar 21. The two tapes extend substantially horizontally in a direction rearwardly of the scale or away from the horizontal portion 13 of the platform, and their rear ends are rigidly secured to the standard S by a cross bar 24 and bolts 25 extending through the cross bar and tapes into the standard, as clearly shown in Figures 1 and 2.

The lower check member F' also comprises a pair of spring tempered metallic tapes or strips 26 and 26$^a$ rigidly secured at one end in spaced parallel relation to the lower rear corner of the vertical portion 14 of the platform by means of screws 27 and 28, the screws 27 passing through the laterally bent ends of the tapes into a cross bar 29 fixed to the vertical portion 14 by bolts 30, and the screws 28 passing through a cap strip 31 and the tapes into the cross bar 29. The tapes 26 and 26$^a$ extend substantially horizontally in a direction forwardly of the scale or towards the horizontal portion of the platform, and their forward ends are rigidly secured to lugs 32 on the base B, by means of screws 33 passing through a cross bar 34 and threaded into the lugs.

With the platform supported in this manner by the flexible check members F and F', it will be clear that the weight of the platform and loads on the horizontal portion 13 of the platform will place the check members in tension by causing pulling forces to be exerted on the members from their points of connection with the support, in the opposed directions indicated by the arrow in Figure 1.

It will be manifest that the members coact by their flexibility in mounting the platform for vertical movement, and that as the amount of movement of the platform is very slight, the flexing of the members is negligible so that practically all friction is eliminated in the mounting of the platform, to the end that greater accuracy in the weighing operation can be obtained.

I claim:

1. A weighing scale comprising an L-shaped platform providing a horizontal portion for articles to be weighed, and a vertical portion projecting upwardly from said horizontal portion; a hollow support for the platform receiving said vertical portion; upper and lower check members; means for rigidly securing one end of each of said members to the support interiorly thereof at different elevations to extend in opposite directions horizontally; and means for rigidly securing the opposite ends of the members to the vertical portion of the platform for co-action of the members in mounting the platform for movement vertically.

2. In a scale organization of the type including a hollow vertical standard and a horizontally disposed platform, the platform having a vertical portion extending into the standard from the bottom thereof and wholly spaced apart from the inner wall surfaces of said vertical portion of said standard, and means for maintaining the aforementioned spaced relationship of the parts from each other, comprising an upper yieldable check unit attached at its rear end to an adjacent inner wall surface of the standard and at its front end to the upper end of the vertical portion of the platform; and a lower yieldable check unit attached at its front end to a lug on an adjacent inner wall surface of said vertical portion of the standard and having its rear end attached to the lower rear face of said vertical portion of said platform.

3. In a scale organization of the type including a hollow vertical standard and a horizontally disposed platform, the platform having a vertical portion extending into the standard from the bottom thereof and wholly spaced apart from the inner wall surface of said vertical portion of said standard, and means for maintaining the aforementioned spaced relationship of the parts from each other, comprising an upper yieldable check unit attached at its rear end to an adjacent inner wall surface of the standard and at its front end to the upper end of the vertical portion of the platform; and a lower yieldable check unit attached at its front end to a lug on an adjacent inner wall surface of said vertical portion of the standard and having its rear end attached to the lower rear face of said vertical portion of said platform, each of said check units including a pair of spring metal strips spaced apart from each other for a distance to dispose them in spaced relation to adjacent vertical faces of said vertical portion of the platform.

CLIFFORD O. ROSS.